Nov. 9, 1948.                A. F. LUSK                2,453,580
                         V-BELT DRIVE PULLEY
Filed June 20, 1946                              2 Sheets-Sheet 1
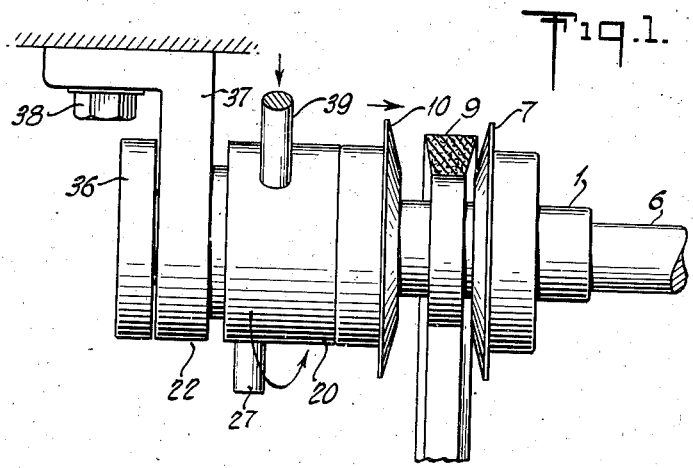
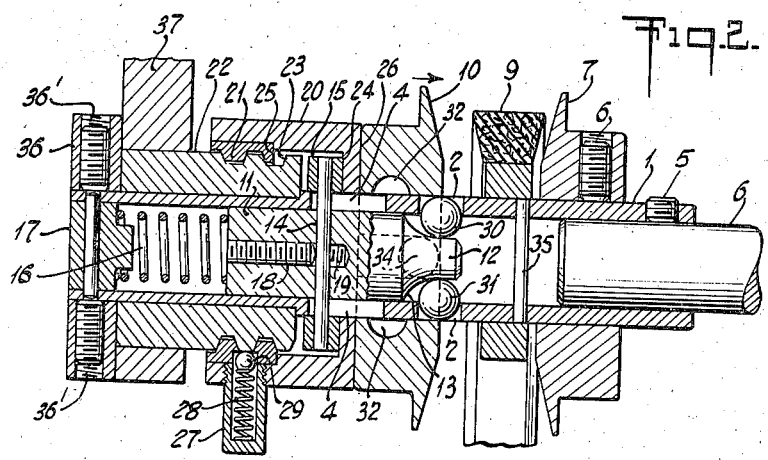
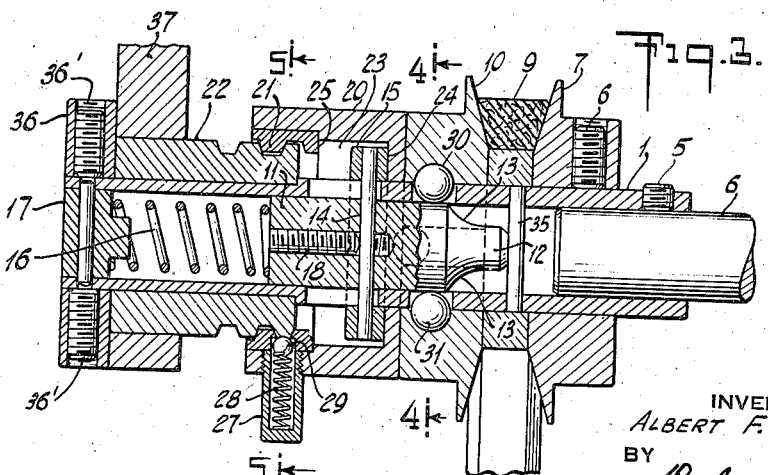
INVENTOR
ALBERT F. LUSK.
BY
*Darby & Darby*
ATTORNEYS

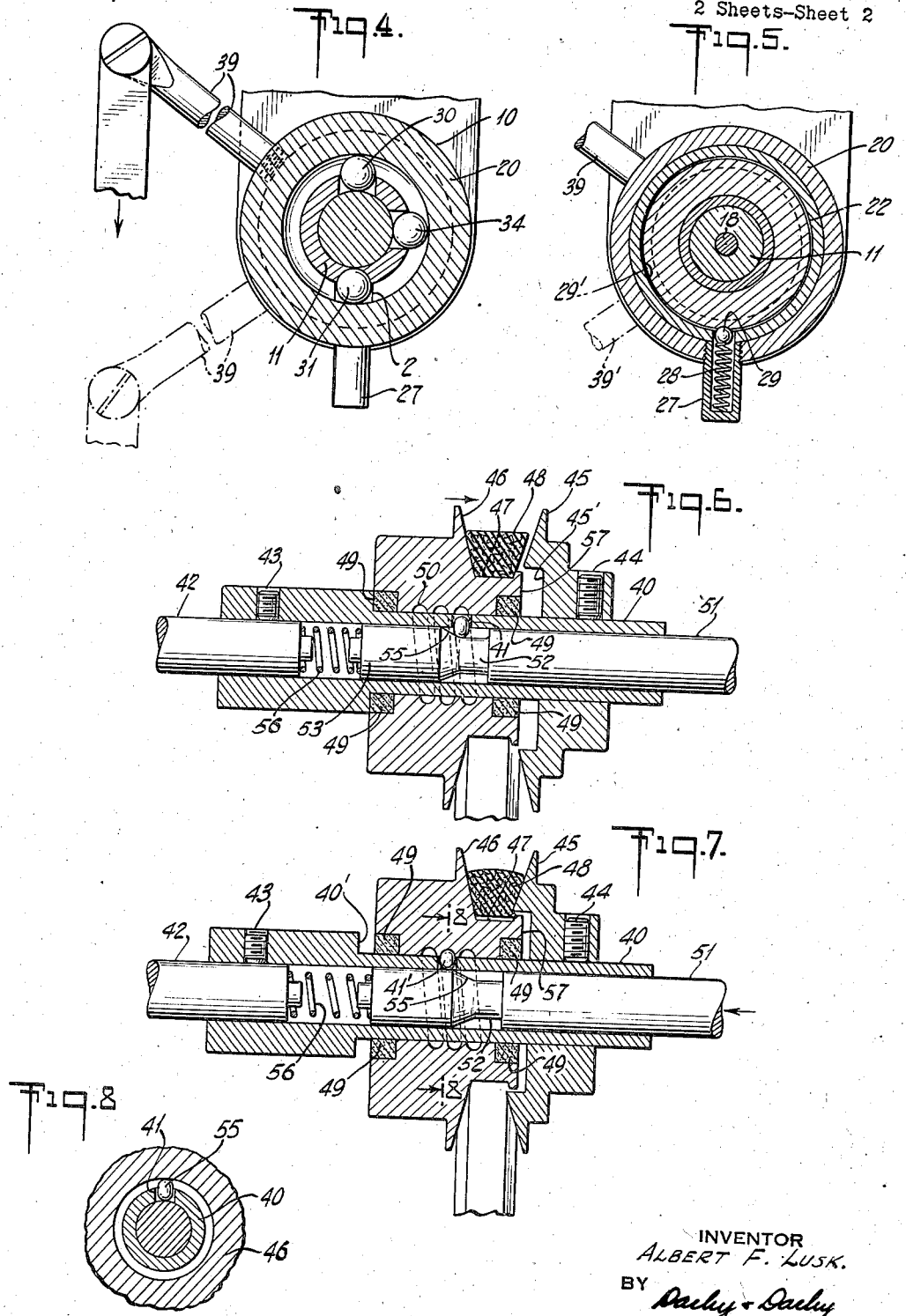

Patented Nov. 9, 1948

2,453,580

UNITED STATES PATENT OFFICE 2,453,580

V-BELT DRIVE PULLEY

Albert F. Lusk, Pontiac, Mich.

Application June 20, 1946, Serial No. 678,054

21 Claims. (Cl. 74—230.24)

This invention relates to V-belt drive pulleys and to clutching mechanism therefor.

The object of the invention is to provide a V-belt drive pulley construction which is adapted to reduce the starting loads for small electric motors as well as to provide a clutching arrangement for all types of V-belt drives.

A further object is to provide a clutching V-type pulley construction wherein one half of the V-type pulley may be manually or automatically moved towards or away from a fixed half thereof and thus operate to engage or disengage belt driven equipment.

With these and other objects in view, the invention consists in certain novel features of construction, combination and arrangement of parts as will be hereinafter fully described and claimed.

Reference is to be had to the accompanying drawings forming a part of the specification and in which—

Figure 1 is a view in side elevation of one form of V-belt drive pulley construction embodying the features of my invention and showing the movable half of the pulley out of engagement with the fixed half thereof.

Figure 2 is a sectional view of the pulley construction as shown in Figure 1.

Figure 3 is a sectional view similar to Figure 2 but showing the movable half of the pulley in its engaged position with respect to the fixed half thereof.

Figure 4 is a sectional view of Figure 3 taken on the line 4—4 thereof and looking in the direction of the arrows.

Figure 5 is a sectional view of Figure 3 taken on the line 5—5 thereof and looking in the direction of the arrows.

Figure 6 is a sectional view of a modified form of construction embodying the features of my invention and indicating the movable half of the pulley out of engagement with the fixed half thereof.

Figure 7 is a sectional view, similar to Figure 6, but showing the movable half of the pulley construction in operative engagement with the fixed half thereof.

Figure 8 is a sectional view of Figure 7 taken on the line 8—8 thereof and looking in the direction of the arrows.

Referring to the drawings, and particularly to the form of construction illustrated in Figures 1 to 5, the numeral 1 denotes a hollow shaft having the slotted openings 2 and 4 provided therein. In one end of the hollow shaft member the end of a driving shaft 6 of a motor is adapted to be secured by means of a suitable set screw indicated at 5. Positioned around said hollow shaft, and fixedly secured thereto by a set screw 6, is one half 7 of a V-type drive pulley. This fixed half of the pulley is provided with an idler means 8, upon which a belt 9 is adapted to ride when the pulley is not functioning to drive said belt. Also mounted around said hollow shaft, and having sliding engagement with respect thereto, is the movable half 10 of said pulley.

Positioned within the hollow shaft, and having sliding engagement therewith, is a plunger type spindle 11. The spindle 11 is formed with a reduced end portion 12, which is joined to the main body of the spindle by the curved portion 13. Keyed to the spindle by means of the pin 14 is a free ring 15. The free ring is held so that it abuts against the inner wall 24 of a ring member 20 by means of an adjustable screw 18 which has a screw threaded engagement in an opening provided through the end of the plunger spindle. The pin 14 is adapted to be moved in the slotted opening 4 of said hollow shaft during the operation of the V-type pulley construction, as will be more fully explained hereinafter. The spindle 11 and the free ring 15 are normally forced forwardly in the hollow shaft 1 and towards the movable half 10 of the pulley by means of a compression spring 16, which has one end abutting against the end of the spindle and the other end secured to a spring stopper 17, fitted into the end of the hollow shaft 1.

Positioned on the hollow shaft 1 is a sleeve member 20 formed with an axially extending flange portion which has a screw thread 21 formed at its extreme end cooperating with said sleeve member 20 and rotatably mounted upon the hollow shaft is a sleeve member 22 which is provided with a screw thread 23. The sleeve member 22 is adapted to turn freely upon the hollow shaft 1 and the screw thread 21 of the sleeve member 20 is adapted to cooperate with and move over the screw thread portion 23 of the sleeve member 22.

The sleeve member 20 is provided with the end walls 24 and 25 and between which the free ring 15 is adapted to move. One face of the free ring is positioned to abut against the movable half 10 of the V-pulley and is adapted to move with said half of the pulley towards the fixed half 7 thereof during the operation of the mechanism of the construction.

The sleeve member 22 is provided with a housing 27 in which is positioned a spring 28 which exerts a continuous tension against a ball 29, The ball 29 is positioned so that it will ride on the screw threaded portion of the sleeve member 20 and is also adapted to fit into a depression 29' drilled into said screw threaded portion (see Figure 5) to provide a lock for the sleeve member 20 during the operation of the pulley mechanism as will be more fully pointed out hereinafter.

In the slotted opening 2 of the hollow shaft 1 there is positioned the steel balls 30 and 31. These balls are adapted to be forced from said slotted opening into depression 32 formed in the movable half 10 of the pulley to lock the movable half of the pulley to the spindle 11 when said spindle has been advanced into position with respect to the fixed half of the pulley (see Figure 3). The shaft 1 also has a ball bearing 34, countersunk therein, and the movable half 10 of said pulley is adapted to ride back and forth on said ball bearing, thus the movable half of the V-pulley is positioned so that it will rotate with the hollow shaft 1, but at the same time will slide back and forth thereon.

Mounted in the hollow shaft 1 is a pin 35 against which the reduced end of the spindle 11 abuts when it has reached the limit of its forward travel during the operation of the mechanism. There is also provided in the construction shown in Figures 1 to 3, a retainer ring 36 which is mounted on the end of the hollow shaft 1 and which is retained in position with respect to said shaft by the set screws 36'. This retainer ring functions to limit the rearward travel of the sleeve member 22.

In use the sleeve member 22 of the V-belt drive pulley construction, is secured to a suitable support or fixture to prevent it rotating on the shaft 1. In Figure 1 of the drawings the said sleeve member is shown formed with a right angled arm portion 37 which is secured to a support by means of a securing bolt 38.

The sleeve member 20 of the mechanism is adapted to be rotated in either a clockwise or counterclockwise direction by a lever 39 to effect the engagement or disengagement of the movable half of the pulley with the fixed half thereof. The lever 39 may be either manually operated or operated by the use of any suitable automatic means.

The operation of the mechanism as shown in Figures 1 to 5 and as above described is as follows:

When it is desired to engage the movable half 10 of the V-pulley in operative position with respect to the fixed half 7, the sleeve member 20 is caused to be turned in a clockwise direction by the lever 39. This causes the said sleeve member 20 to ride over the screw thread portion 23 of the sleeve member 22 and along the shaft 1, and towards the fixed half of the pulley, and with its end face 26 pushing the movable half of the pulley towards the fixed half. At the same time the pin 14, to which the free ring member 15 is keyed, is caused to be moved forwardly in the slot 4, of the shaft 1, by reason of the pressure placed upon the end of the spindle 11 by the spring 16, and thus the spindle is also moved forward within the hollow shaft 1 towards the fixed half of said pulley. As the spindle is moved forward the balls 30 and 31 are forced out of the slot 2 in the hollow shaft 1 by the curved portion 13 of the reduced end of the spindle, and into the depressions 32 formed in the movable half 10 of the pulley. By this time the spindle's main diameter has been brought under the balls 30 and 31 and thus the movable half of the pulley becomes locked into position with respect to the fixed half of the pulley and will rotate therewith.

When the movable half of the pulley is to be disengaged from the fixed half thereof, it is allowed to back away from the fixed half, the pressure of the belt 9 providing the necessary force. To start this movement the sleeve member 20 is turned in a counterclockwise direction and the spindle 23 is thus pulled away from the fixed half of the pulley being driven back by reason of the movement of the sleeve member 20 pushing against the free ring 15 keyed to the pin 14. The turning of the sleeve member 20 and the resulting backing off of the spindle causes the spring 16 to be compressed and as the sleeve member 20 moves backwardly the ball 29, which is held under tension in the spiral grooves of the worm of sleeve member 22, drops into the depression 29' formed in the screw thread of sleeve member 20. This causes the sleeve member 20 to become locked against movement in its disengaged position.

In the modified form of construction of the V-belt drive pulley of my invention shown in Figures 6, 7 and 8 there is employed a hollow shaft 40 which is provided with an opening 41 therein. The shaft is formed with an enlarged end portion having a shoulder 40'. The driving shaft 42 of a motor is adapted to be received in the enlarged portion of the hollow shaft and secured to the same by a set screw 43. Positioned on the hollow shaft and fixedly secured thereto by the set screw 44 is one half 45 of a V-type drive pulley. The fixed half of the drive pulley is formed with a cutaway portion 45'. Also slidably mounted on the hollow shaft is the movable half 46 of the pulley. The movable half of said pulley is formed with a small diameter portion 47 upon which the V-belt 48 is adapted to ride when the movable half of the pulley is disengaged from the fixed half thereof. The movable half of the pulley rides on oilless bearings indicated at 49, and which are positioned between it and the hollow shaft 40. The movable half of the pulley is also provided with a ball bearing thread 50 which is machined on the interior circumference thereof.

Slidingly mounted within the hollow shaft 40 is a plunger type spindle 51. Said spindle is formed with a depressed portion 52 adjacent its end 53, said depressed portion being joined to the end of the spindle by an angular faced portion 55. A ball bearing driving member 41' is positioned in the opening 41 of the hollow shaft and so that it is in contact with the surface of the depressed portion 52 of the spindle.

Mounted within the hollow shaft 40 and positioned against the face of the inner end 53 of the spindle is a compression spring 56. This spring functions to exert a constant pressure against the end of said spindle. The positioning of the spindle within the hollow shaft during the operation of the pulley mechanism is controlled by manual or automatically operated means (not shown), as will be more fully explained hereinafter.

The operation of the mechanism of the pulley construction shown in Figures 6, 7 and 8 is as follows:

Referring to Figure 6 of the drawings, the movable half 46 of the pulley is shown disengaged from the fixed half 45. When the pulley mechanism is in this condition the spindle 51 is permitted to be moved outwardly in the hollow shaft 40 by the action of the spring 56. At the time this is occurring the hollow shaft 40, which is secured to the driving shaft 42, is rotating with the driving shaft and the ball bearing driving member 41' is thus caused to be forced out of the opening 41 in shaft 40 by reason of the angular faced portion 55 of the spindle and into the ball bearing thread 50 formed in the movable half 46 of the pulley. This causes the pulley portion 46 to move towards the fixed portion 45 thereof, and also to become locked to the revolving shaft so that it rotates therewith. The belt 48 on the small diameter portion 47 of the movable half of the pulley is thus made to rotate as it wedges between the two halves of said pulley. If the source of the load which the belt is driving is great enough the movable half of the pulley will close all of the way with respect to the fixed half and until the face 57 thereof abuts against the face of the cutaway portion 45' of the fixed half of said pulley. If the source of the load is light enough, the movable half of the pulley will close in on the fixed half just sufficiently to drive the load and then, as the load is increased, it will close in further until it reaches its fixed position with the fixed half of the pulley.

When it is desired to disengage the movable half of the pulley from the fixed half the operation is started by forcing the spindle 51, by manual or automatic means, inwardly against the action of the compression spring 56. When this is done the ball bearing driving member 41' will be forced from its locked position with the diameter of the spindle and back into the cutaway recess in the spindle thus allowing said ball bearing driving member to disengage itself from the ball bearing thread. The pressure of the revolving belt 48 will provide the necessary force to push the movable half of the pulley away from the fixed half when it is released from its locked position with respect to the hollow shaft and as the gap between the two halves of the pulley widens the belt will lower itself down upon the small diameter 47 of the movable half of the pulley and then both the belt and the movable half of the pulley will come to rest upon the revolving hollow shaft.

What is claimed is:

1. In a V-belt drive pulley construction, the combination of a pulley having one half thereof fixedly mounted on a rotatable shaft and the other half slidably mounted on said shaft, means for rotating said shaft, means for moving the slidable half of said pulley along said shaft and into operative position with respect to the fixed half during the rotation of said shaft, means for effecting the operation of said pulley moving means, and means for causing the slidable half of the pulley to become locked to said shaft so that it will rotate therewtih as it is moved into operative position with respect to the fixed half thereof.

2. In a V-belt drive pulley construction, the combination of a pulley having one half thereof fixedly mounted on a rotatable shaft and the other half slidably mounted on said shaft and normally non-rotatable therewith, means for rotating said shaft, means for moving the slidable half of said pulley along said shaft and into operative position with respect to the fixed half during the rotation of said shaft, means for effecting the operation of said pulley moving means, means for causing the slidable half of said pulley to become locked to the shaft so that it will rotate therewith as it is moved into operative position with respect to the fixed half of the pulley, and means for causing the slidable half of said pulley to be released from its operative position with respect to the fixed half thereof and from its locked relation with respect to said shaft.

3. In a V-belt drive pulley construction the combination of a pulley having one half thereof fixedly mounted upon a rotatable hollow shaft and the other half slidably mounted upon said shaft and normally non-rotatable therewith, means for rotating said hollow shaft, means slidably mounted upon said hollow shaft for moving the slidable half of said pulley into operative position with respect to the fixed half thereof, means to lock the slidable half of the pulley to the shaft so that it will rotate therewith, and means for effecting the simultaneous operation of said pulley moving and locking means.

4. In a V-belt drive pulley construction the combination of a pulley having one half thereof fixedly mounted upon a rotatable hollow shaft and the other half slidably mounted on said shaft and normally non-rotatable therewith, means for rotating said hollow shaft, a spindle slidably mounted within said hollow shaft and having means associated therewtih for causing said slidable half of said pulley to be moved into operative position with respect to the fixed half thereof and to lock the same to the shaft so that it will rotate therewith, means for moving said spindle within the hollow shaft to effect the operation of the pulley moving and locking means.

5. In a V-belt drive pulley construction the combination of a pulley having one half thereof fixedly mounted upon a rotatable hollow shaft and the other half slidably mounted upon said shaft and normally non-rotatable therewith, means for rotating said hollow shaft, means mounted on said shaft for moving the slidable half of said pulley into operative position with respect to the fixed half thereof during the rotation of said shaft, and to hold said pulley half in said operative position, means for locking the slidable half of the pulley to the shaft so that it will rotate therewith as it is moved into operative position with respect to the fixed half thereof, and means for locking said pulley moving means against movement when the slidable half of the pulley is out of operative position with respect to the fixed half thereof.

6. In a V-belt drive pulley construction the combination of a pulley having one half thereof fixedly mounted on a rotatable hollow shaft and the other half slidably mounted on said shaft and normally non-rotatable therewith, means for rotating said hollow shaft, a spindle slidably mounted within said hollow shaft and having means associated therewith for causing the slidable half of said pulley to become locked to said shaft and so that it will rotate therewith, and means mounted on said hollow shaft for moving the slidable half of the pulley into engagement with the fixed half thereof, during the rotation of said shaft, and for moving said spindle so that it will cause said locking means to lock the movable half of the pulley to the hollow shaft when said half of the pulley is being moved into operative position with the fixed half thereof.

7. In a V-belt drive pulley construction, the combination of a pulley having one half thereof fixedly mounted upon a rotatable hollow shaft and the other half thereof slidably mounted upon said shaft and normally non-rotatable therewith, means for rotating said hollow shaft, means mounted upon said shaft for moving said slidable half of the pulley into operative position with respect to the fixed half thereof and to hold it in said position, means for operating said pulley moving means, means for locking the slidable half of said pulley to the hollow shaft so that it will rotate therewith after it has been positioned with respect to the fixed half, and means for operating said pulley moving means to render it inoperative when the slidable half of the pulley is out of operative position with respect to the fixed half of the pulley.

8. In a V-belt drive pulley construction the combination of a pulley having one half thereof fixedly mounted upon a rotatable shaft and the other half slidably mounted upon said shaft, means for rotating said shaft, means mounted upon said shaft for moving said slidable half of the pulley along said shaft during the rotation thereof to cause it to become operatively engaged with the fixed half of the pulley, means for locking the slidable half of the pulley to the shaft so that it will rotate therewith, means operated by said pulley moving means for causing said locking means to effect the locking of the slidable half of the pulley to the shaft when it has been moved into engagement with the fixed half.

9. In a V-belt drive pulley construction the combination of a pulley having one half thereof fixedly mounted upon a rotatable hollow shaft and the other half slidably mounted upon said shaft and normally non-rotatable therewith, means for rotating said hollow shaft, a spindle slidably operable within said hollow shaft, means associated with said spindle and operable thereby for locking the slidable half of the pulley to said hollow shaft so that it will rotate therewith, means mounted upon said hollow shaft for moving the slidable half of said pulley into operative engagement with the fixed half thereof and for simultaneously moving said spindle to cause said locking means to effect the locking of the slidable half of the pulley to said hollow shaft.

10. In a V-belt drive pulley construction the combination of a pulley having one half thereof fixedly mounted upon a rotatable hollow shaft and the other half slidably mounted upon said shaft and normally non-rotatable therewith, means for rotating said hollow shaft, a spindle slidably operable within said hollow shaft, means associated with said spindle and operable thereby for locking the slidable half of the pulley to said hollow shaft and so that it will rotate therewith, a sleeve member mounted upon said shaft having a screw thread formed on its outer circumference, means for holding said sleeve member from rotating with said shaft, a second sleeve member mounted upon said shaft and positioned so that its outer face will abut against the slidable half of said pulley, said sleeve member being formed with an axially extending flange having a screw thread formed on its extreme end which is adapted to cooperate with the screw thread of said first mentioned sleeve member, a spindle slidably mounted within said hollow shaft, means associated with said spindle and operable thereby for locking the slidable half of said pulley to said hollow shaft and so that it will rotate therewith, means for operating said second mentioned sleeve member to move the slidable half of said pulley into operative engagement with the fixed half thereof and to simultaneously cause said spindle to operate said locking means to lock the movable half of the pulley to said shaft.

11. In a V-belt pulley construction the combination of a pulley having one half thereof fixedly mounted upon a rotatable hollow shaft and the other half slidably mounted upon said shaft and normally non-rotatable therewith, means for rotating said hollow shaft, a spindle slidably mounted within said hollow shaft and formed with a reduced portion at one end thereof, ball bearing means positioned in an opening in said hollow shaft and normally supported on the reduced end portion of said spindle, means slidably mounted upon said hollow shaft for moving the slidable half of the pulley along said shaft and towards the fixed half thereof, means associated with said spindle adapted to contact with said pulley moving means and yieldingly held in contact therewith, and means for operating said pulley moving means to move the slidable half of said pulley into engaged position with respect to the fixed half thereof and to cause said spindle to force said ball bearing means through the opening in said shaft to lock said movable half of the pulley to the shaft and so that it will rotate therewith.

12. In a V-belt drive pulley construction the combination of a pulley having one half thereof fixedly mounted upon a rotatable hollow shaft and the other half slidably mounted upon said shaft and having a ball bearing thread formed on the interior circumference thereof, means secured to said hollow shaft for rotating the same, a sleeve member loosely mounted upon said hollow shaft and provided with a screw thread upon the outer circumference thereof, means for holding said sleeve member against rotation with said shaft, a second sleeve member mounted upon said shaft and formed with an axially extending flange having a screw thread formed at its extreme end portion which cooperates with the screw thread formed on the first mentioned sleeve member, a spindle slidingly mounted within the hollow shaft and formed with a reduced end portion, a pin secured to said spindle and positioned so that its ends extend through an opening in said hollow shaft, a ring member secured to said pin and positioned so that it will abut against the inner face of the second mentioned sleeve member, tension means for holding said spindle within the hollow shaft and so that said ring member will be in abutting relation with the inner face of the second mentioned sleeve member, means for moving said second mentioned sleeve member along the shaft in one direction so that it will move the slidable half of the pulley into operative position with respect to the fixed half thereof, and so that the spindle will be permitted to advance within the shaft by reason of the action of said tension means, and in the opposite direction so that said sleeve member will be withdrawn from its abutting relation with respect to the slidable half of the pulley and said spindle will be moved backwardly in a retracted position within the shaft and held in such position against the action of said tension means, ball bearing means positioned in an opening formed in said hollow shaft and adapted to be supported by the reduced end of said spindle when said spindle is held in its retracted position and forced from said opening in the shaft into the ball bearing thread formed in the movable half of the pulley to lock the said pulley half to the shaft so that it will rotate therewith when said spindle is advanced within the shaft by the action of said tension means, and means for locking said second mentioned pulley moving sleeve member against movement after it has been withdrawn from its abutting relation with respect to said slidable half of the pulley.

13. In a V-belt drive pulley construction the combination of a pulley having one half thereof fixedly mounted upon a rotatable hollow shaft and the other half slidably mounted upon said shaft, means for rotating said hollow shaft, a spindle slidably mounted within said hollow shaft, means operable by said spindle for causing the slidable half of the pulley to be moved into and out of operative position with respect to the fixed half thereof, and means for slidably moving said spindle within said hollow shaft, and during the rotation thereof, to effect the operation of said pulley moving means.

14. In a V-belt drive pulley construction the combination of a pulley having one half thereof fixedly mounted upon a rotatable hollow shaft and the other half slidably mounted upon said shaft, means for rotating said hollow shaft, a spindle slidably mounted within said shaft, means for locking the slidable half of the pulley to said hollow shaft so that it will rotate therewith and for moving said pulley half into and out of operative position with respect to the fixed half thereof, and means for operating said spindle to effect the operation of said pulley locking and moving means.

15. In a V-belt drive pulley construction the combination of a pulley having one half thereof fixedly mounted upon a rotatable hollow shaft and the other half slidably mounted upon said shaft and having a ball bearing thread formed on the interior circumference thereof, means for rotating said hollow shaft, a spindle slidably mounted within said shaft, ball bearing means adapted to be positioned in the ball bearing thread of the slidable half of the pulley by the movement of the spindle within the hollow shaft, and to move the said pulley half along the shaft and into and out of operative engagement with the fixed half of the pulley and to simultaneously lock said pulley half to the shaft, and means to slidably operate said spindle within the hollow shaft to cause the pulley moving and locking operation effected by said ball bearing means.

16. In a V-belt drive pulley construction the combination of a pulley having one half thereof fixedly mounted upon a rotatable hollow shaft and the other half thereof slidably mounted upon said shaft, a ball bearing thread formed on the interior circumference of the slidable half of said pulley, a ball bearing member adapted to cooperate with said ball bearing thread of the slidable half of the pulley to move the said pulley half along the shaft and into operative position with respect to the fixed half, means slidingly operable within the hollow shaft for effecting the engagement and disengagement of the ball bearing member with respect to the ball bearing thread, and means for effecting the operation of said slidable means.

17. In a V-belt drive pulley construction the combination of a pulley having one half thereof fixedly mounted upon a rotatable hollow shaft and the other half thereof slidably mounted upon said shaft and having a ball bearing thread formed on the interior circumference thereof, a ball bearing member adapted to cooperate with said ball bearing thread to lock the slidable half of the pulley to said shaft so that it will rotate therewith and to move the said pulley half along the shaft during the rotation thereof and into operative position with respect to the fixed half of the pulley, a spindle slidably mounted within the hollow shaft for effecting the engagement and disengagement of the ball bearing member in and from the ball bearing thread of the slidable half of the pulley, and means for effecting the operation of the spindle with said hollow shaft.

18. In a V-belt drive pulley construction the combination of a pulley having one half thereof fixedly mounted upon a rotatable hollow shaft and the other half slidably mounted upon said shaft and having a ball bearing receiving thread formed on the interior circumference thereof, means for rotating said hollow shaft, a spindle slidably mounted within the hollow shaft and formed with a reduced portion adjacent one end thereof, ball bearing means normally positioned in an opening formed in said hollow shaft and supported by the reduced portion of the spindle, a spring cooperating with the inner end of the spindle, means for holding said spindle positioned within the hollow shaft and against the action of said spring so that its reduced portion will support the said ball bearing means when it is positioned in the opening in the hollow shaft, means for releasing said spindle from its held position within the shaft to permit the same to be moved by the action of said spring and so that it will cause the ball bearing means to be forced through the opening in the shaft and into engagement with the ball bearing receiving thread of the slidable half of the pulley, to lock the slidable half of the pulley to the rotating hollow shaft, and to cause it to be moved along the shaft into operative position with respect to the fixed half thereof.

19. In a V-belt drive pulley construction the combination of a pulley having one half thereof fixedly mounted upon a rotatable hollow shaft and the other half slidably mounted upon said shaft and having a ball bearing thread formed on the interior circumference thereof, means secured to the hollow shaft for rotating the same, a spindle mounted within said hollow shaft and formed with a reduced portion adjacent one end thereof, a spring cooperating with the inner end of said spindle, ball bearing means positioned in an opening formed in the hollow shaft and adapted to be supported by the reduced portion of the spindle, means for holding said spindle positioned within said hollow shaft, against the tension action exerted by said spring and so that the reduced portion thereof will support said ball bearing means, means for releasing said spindle from its held position and so that said spring will cause the spindle to move within the shaft to force said ball bearing means through the opening in the shaft and into the ball bearing thread of the slidable half of the pulley to lock the pulley half to the hollow shaft and to cause the same to be moved into operative position with respect to the fixed half thereof.

20. In a V-belt drive pulley construction the combination of a pulley having one half thereof fixedly mounted upon a rotatable hollow shaft and the other half slidably mounted upon said shaft and having a ball bearing thread formed on the interior circumference thereof, means for rotating said shaft, a spindle slidingly positioned within said shaft and formed with a reduced portion adjacent one end thereof, ball bearing driving means for advancing said slidable half of the pulley along said shaft and into operative position with respect to the fixed half thereof, said ball bearing driving means being normally positioned in an opening in said hollow shaft and supported by the reduced portion of said spindle, a spring mounted within the hollow shaft and positioned so that it exerts a continuous tension against the inner end of said spindle, means for normally holding said spindle within the hollow shaft against the tension action of said spring and so that the reduced portion thereof is positioned to support the ball bearing driving means when said means are positioned in the opening in said shaft, means for releasing said spindle from its normally held position and so that said spring will cause the spindle to force the ball bearing driving means through the opening in said shaft and into said ball bearing thread of the slidable half of the pulley and so that said ball bearing driving means will lock said pulley half to the shaft and will also operate to move said pulley half along said shaft and into operative position with respect to the fixed half thereof.

21. In a V-belt drive pulley construction the combination of a hollow shaft having slotted openings therein, means for rotating said shaft, a pulley having one half thereof fixedly mounted and the other half slidably mounted upon said shaft, a spindle having sliding engagement within said hollow shaft and formed with a reduced end portion which is joined to the main body of the spindle by a curved connecting portion, a pin secured to said spindle and extending through one of the slotted openings in said shaft, a ring member secured to said pin and having sliding engagement with said shaft, spring means to normally force the spindle and ring member towards the fixed half of the pulley, a sleeve member mounted upon said shaft and having an external thread formed thereon, a second sleeve member having an axially extending flange portion formed with an internal screw thread at its outer end and which is adapted to cooperate with and move over the external screw thread of the first mentioned sleeve member, said ring member of the spindle being positioned to abut against the inner face of said second mentioned sleeve member, a spring positioned in said housing and adapted to exert tension upon a ball bearing, said ball bearing being positioned to ride in the screw thread formed on the first mentioned sleeve member, ball bearings positioned in the other slotted opening in the hollow shaft, a screw thread formed on the interior circumference of the slidable half of the pulley, means to force such ball bearings into the screw thread of the slidable half of the pulley to lock the pulley half to the shaft when it has been advanced along the shaft into position with respect to the fixed half of the pulley, a ball bearing positioned in a depression formed in the hollow shaft and upon which the slidable half of the pulley is adapted to ride back and forth when it is moved along the shaft, a pin mounted within the hollow shaft to limit the travel of the spindle toward the fixed half of the pulley, ring means mounted on one end of the hollow shaft to limit the rearward travel of the first mentioned sleeve member along the shaft, means to secure the first mentioned ring member against rotation upon the hollow shaft, means to rotate the second mentioned sleeve member in a clockwise or counterclockwise direction to move the same along the shaft to effect the engagement or disengagement of the slidable half of the pulley with respect to the fixed half.

ALBERT F. LUSK.

REFERENCES CITED

The following references are of record in the file of this patent:

UNITED STATES PATENTS

| Number | Name | Date |
| --- | --- | --- |
| 1,431,376 | Davis | Oct. 10, 1922 |
| 1,516,386 | Kegresse | Nov. 18, 1924 |
| 2,259,149 | Cederstrom | Oct. 14, 1941 |